United States Patent
Liao et al.

(10) Patent No.: US 11,327,375 B2
(45) Date of Patent: May 10, 2022

(54) REFLECTIVE CHOLESTERIC LIQUID CRYSTAL DISPLAY

(71) Applicant: Iris Optronics Co., Ltd., Tainan (TW)

(72) Inventors: Chi-Chang Liao, Tainan (TW); Chun-Kang Ku, Hsinchu County (TW)

(73) Assignee: Iris Optronics Co., Ltd., Tainan (TW)

( * ) Notice: Subject to any disclaimer, the term of this patent is extended or adjusted under 35 U.S.C. 154(b) by 85 days.

(21) Appl. No.: 16/874,697

(22) Filed: May 15, 2020

(65) Prior Publication Data

US 2021/0165255 A1     Jun. 3, 2021

(30) Foreign Application Priority Data

Nov. 29, 2019   (TW) .................................. 108143661

(51) Int. Cl.
| | |
|---|---|
| *G02F 1/1347* | (2006.01) |
| *G02F 1/1343* | (2006.01) |
| *G02F 1/1335* | (2006.01) |
| *G02F 1/1339* | (2006.01) |

(52) U.S. Cl.
CPC ........ *G02F 1/1347* (2013.01); *G02F 1/13394* (2013.01); *G02F 1/13439* (2013.01); *G02F 1/133512* (2013.01); *G02F 1/133514* (2013.01); *G02F 1/134309* (2013.01); *G02F 2202/28* (2013.01); *G02F 2203/02* (2013.01)

(58) Field of Classification Search
CPC ............... G02F 1/1347; G02F 1/13473; G02F 1/13718; G02F 1/133512; G02F 1/133514; G02F 1/13394; G02F 1/134309; G02F 1/13439; G02F 2202/28; G02F 2203/02
See application file for complete search history.

(56) References Cited

U.S. PATENT DOCUMENTS

| | | | |
|---|---|---|---|
| 6,256,080 B1 * | 7/2001 | Colgan ............. | G02F 1/133753 349/110 |
| 6,597,419 B1 * | 7/2003 | Okada ................. | G02F 1/13718 349/104 |
| 2012/0274887 A1 * | 11/2012 | Hwang ............... | G02F 1/13473 349/115 |
| 2013/0222749 A1 * | 8/2013 | Chiang ............. | G02F 1/133512 349/113 |

FOREIGN PATENT DOCUMENTS

| | | |
|---|---|---|
| TW | 574586 B | 2/2004 |
| TW | 201033713 A1 | 9/2010 |

* cited by examiner

*Primary Examiner* — Edward J Glick
*Assistant Examiner* — David Y Chung

(57) ABSTRACT

A reflective cholesteric liquid crystal display includes a display unit. The display unit includes a upper transparent substrate, a lower substrate, a upper transparent electrode pattern formed on the upper transparent substrate, a lower transparent electrode pattern formed on the lower substrate, a cholesteric liquid crystal layer sandwiched between the upper transparent electrode pattern and the lower transparent electrode pattern, and a light absorbing layer formed on the upper transparent substrate. The cholesteric liquid crystal layer is used for generating a visible light including a wavelength range. The light absorbing layer is used for absorbing light outside the wavelength range, so that the visible light in the wavelength range passes through the light absorbing layer and the upper transparent substrate.

8 Claims, 7 Drawing Sheets

REFLECTIVE CHOLESTERIC LIQUID CRYSTAL DISPLAY

FIELD OF THE INVENTION

The present invention relates to a display, and more particularly to a reflective cholesteric liquid crystal display.

BACKGROUND OF THE INVENTION

Reflective cholesteric liquid crystal display is one of the most attractive display technologies. The molecular arrangement of the cholesteric liquid crystal has two stable states: focal conic state and planar state, and therefore cholesteric liquid crystal has bistable characteristics. That is, cholesteric liquid crystal can maintain the original liquid crystal molecular arrangement without external energy. The arrangement of the liquid crystal molecules can be controlled to switch between focal conic state and planar state by voltage. The cholesteric liquid crystal in a planar state can reflect light of a specific wavelength. On the contrary, cholesteric liquid crystal in a focal conic state allows light to pass therethrough. Therefore, the voltage applied to the cholesteric liquid crystal can be used for controlling whether the cholesteric liquid crystal is penetrated by light or reflects light of a specific wavelength.

According to Bragg's Law, the wavelength of the incident light is proportional to $\sin \theta$, wherein $\theta$ is the glancing angle. The smaller the glancing angle $\theta$, the closer the incident light is to the surface of the reflective cholesteric liquid crystal display, the shorter the wavelength of the reflected light reflected by the cholesteric liquid crystal, and thus causing the color shift of the reflected light. As a result, the image quality of the reflective cholesteric liquid crystal display is reduced.

SUMMARY OF THE INVENTION

A reflective cholesteric liquid crystal display provided by the present invention includes a first display unit. The first display unit includes a first upper transparent substrate, a first lower substrate, a first upper transparent electrode pattern formed on the first upper transparent substrate, a first lower transparent electrode pattern formed on the first lower substrate, a first cholesteric liquid crystal layer sandwiched between the first upper transparent electrode pattern and the first lower transparent electrode pattern, and a first light absorbing layer formed on the first upper transparent substrate. The first upper transparent electrode pattern and the first lower transparent electrode pattern face each other. The first cholesteric liquid crystal layer is used for generating a first visible light. The first visible light includes a first wavelength range. The first light absorbing layer is used for absorbing light outside the first wavelength range, so that the first visible light in the first wavelength range passes through the first light absorbing layer and the first upper transparent substrate.

Another reflective cholesteric liquid crystal display provided by the present invention includes the aforementioned first display unit, a second display unit and a first optical transparent adhesive layer. The first optical transparent adhesive layer is adhered between the first display unit and the second display unit. The second display unit includes a second upper transparent substrate, a second lower transparent substrate, a second upper transparent electrode pattern formed on the second upper transparent substrate, a second lower transparent electrode pattern formed on the second lower transparent substrate, a second cholesteric liquid crystal layer sandwiched between the second upper transparent electrode pattern and the second lower transparent electrode pattern, and a first light absorbing layer formed on the second lower transparent substrate. The first optical transparent adhesive layer is adhered between the first upper transparent substrate and the second lower transparent substrate. The second upper transparent electrode pattern and the second lower transparent electrode pattern face each other. The second cholesteric liquid crystal layer is used for generating a second visible light. The second visible light passes through the second upper transparent electrode pattern and the second upper transparent substrate and includes a second wavelength range. The first wavelength range is different from the second wavelength range. The first light absorbing layer is used for absorbing light outside the first wavelength range, so that the first visible light in the first wavelength range passes through the first light absorbing layer and the second upper transparent substrate.

Based on the above, the reflective cholesteric liquid crystal display of the present invention uses at least one light absorbing layer (e.g., first light absorbing layer) to reduce the emission of the light outside a specific wavelength range (e.g., first wavelength range) to improve image quality.

DETAILED DESCRIPTION OF PREFERRED EMBODIMENTS

Figure 1A:
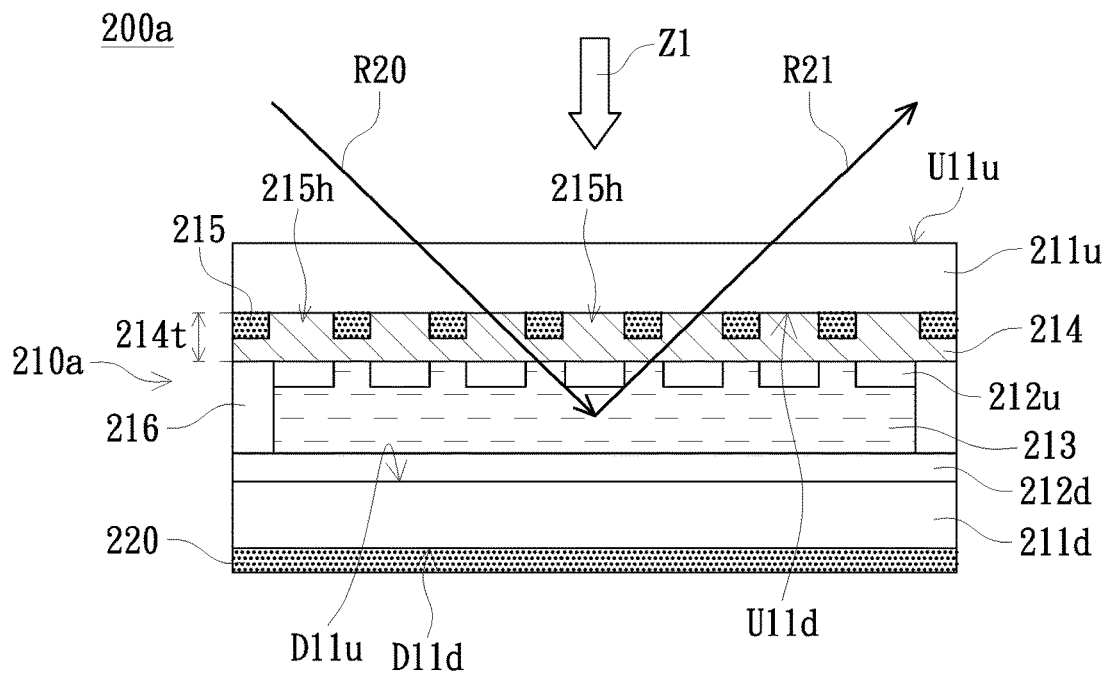
FIGS. 1A and 1B are schematic cross-sectional views of a reflective cholesteric liquid crystal display according to an embodiment of the present invention.
Figure 1B:
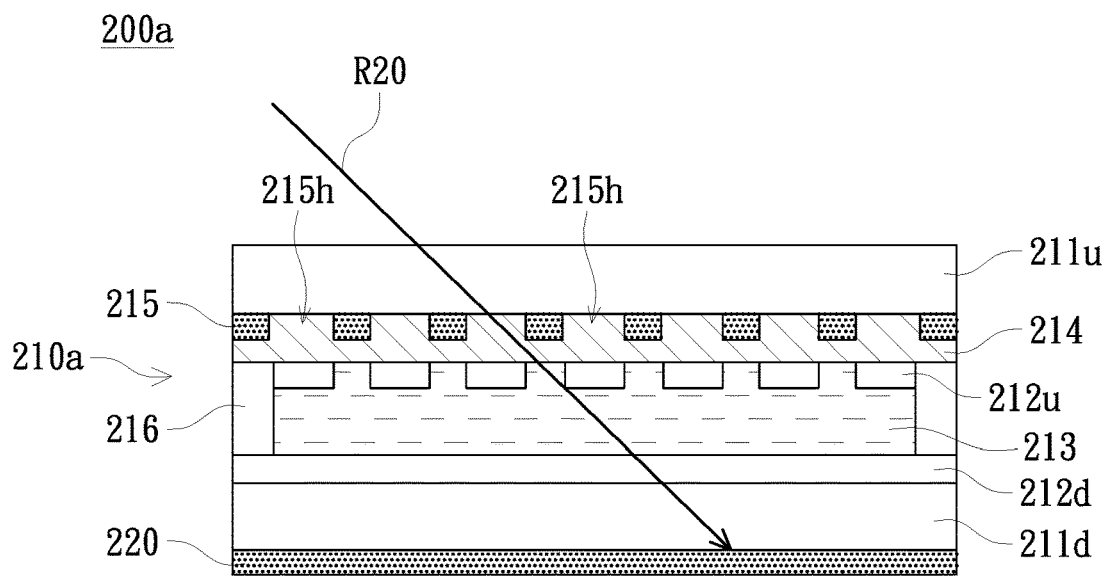

FIGS. 1A and 1B are schematic cross-sectional views of a reflective cholesteric liquid crystal display according to an embodiment of the present invention. The reflective cholesteric liquid crystal display 200a includes a first display unit 210a. The first display unit 210a includes a first upper transparent substrate 211u and a first lower substrate 211d. The first upper transparent substrate 211u may be a rigid substrate, such as a glass plate or a poly (methyl methacrylate, i.e., acrylic, hereinafter referred to as PMMA) substrate. Alternatively, the first upper transparent substrate 211u may be a flexible substrate, such as a substrate made of polyimide (hereinafter referred to as PI) or polyethylene terephthalate (hereinafter referred to as PET).

The first lower substrate 211d may be the same as the first upper transparent substrate 211u. That is, the first lower substrate 211d may be a transparent substrate, and may be the above rigid substrate or the above flexible substrate. In other embodiments, the first lower substrate 211d may also be an opaque substrate. For example, the first lower substrate 211d may be black opaque PMMA substrate, PI substrate, or PET substrate, so that the first lower substrate 211d absorbs visible light and appears black. In addition, both the first upper transparent electrode pattern 212u and the first lower transparent electrode pattern 212d are made of the same material, and may be both transparent conductive materials.

The first display unit 210a further includes a first upper transparent electrode pattern 212u and a first lower transparent electrode pattern 212d. The first upper transparent electrode pattern 212u is formed on the first upper transparent substrate 211u, and the first lower transparent electrode pattern 212d is formed on the first lower substrate 211d.

In detail, the first upper transparent electrode pattern 212u is formed on the surface of the first upper transparent substrate 211u, but it is not necessary to contact the first upper transparent substrate 211u. Taking FIG. 1A as an example, the first upper transparent electrode pattern 212u is located below the lower surface U11d of the first upper transparent substrate 211u and does not contact the lower surface U11d. In contrast, the first lower transparent electrode pattern 212d is formed on the surface of the first lower substrate 211d and is located on the upper surface D11u of the first lower substrate 211d, wherein the first lower transparent electrode pattern 212d contacts the upper surface D11u. Therefore, the meaning of "transparent electrode pattern formed on the substrate" in the above and below descriptions in the present invention covers that the transparent electrode pattern is in contact with or not in contact with the substrate.

Figure 1C:
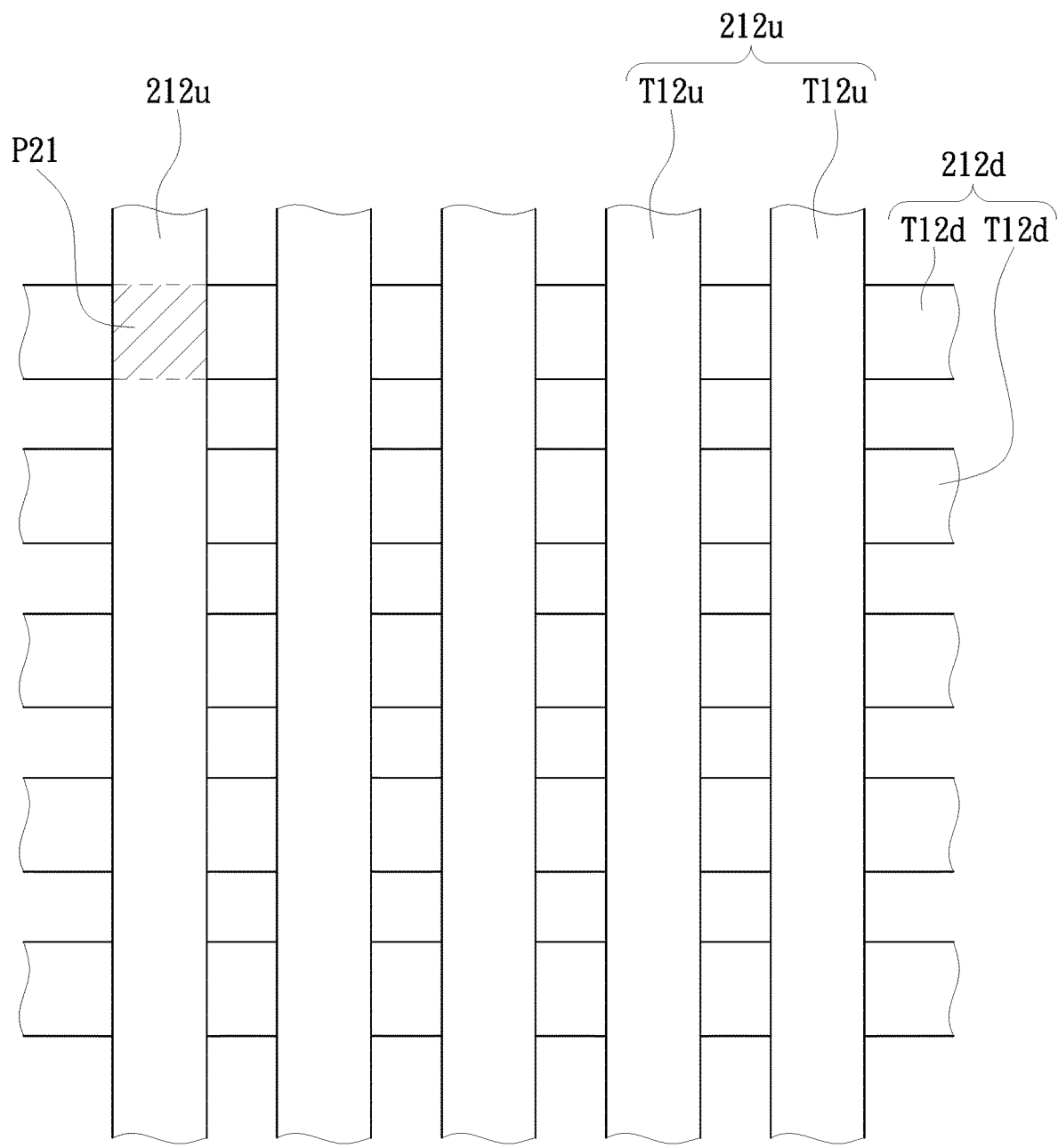
FIG. 1C is a schematic top view of the first upper transparent electrode pattern and the first lower transparent electrode pattern in FIG. 1A.

FIG. 1C is a schematic top view of the first upper transparent electrode pattern 212u and the first lower transparent electrode pattern 212d, drawn by viewing the reflective cholesteric liquid crystal display 200a in a direction Z1 in FIG. 1A. Both the first upper transparent electrode pattern 212u and the first lower transparent electrode pattern 212d are patterned films and can be formed by thin film deposition and photolithography. The first upper transparent electrode pattern 212u may include a plurality of first upper conductive stripes T12u arranged in parallel, and the first lower transparent electrode pattern 212d may include a plurality of first lower conductive stripes T12d arranged in parallel. The first upper conductive stripes T12u and the first lower conductive stripes T12d are crossed over each other.

The first display unit 210a further includes a first cholesteric liquid crystal layer 213 sandwiched between the first upper transparent electrode pattern 212u and the first lower transparent electrode pattern 212d. When a voltage is applied between the first upper transparent electrode pattern 212u and the first lower transparent electrode pattern 212d, an electric field generates between the first upper transparent electrode pattern 212u and the first lower transparent electrode pattern 212d in a plurality of overlapping regions P21 (shown as an oblique line region in FIG. 1C, in which only one overlapping region P21 is indicated for explanation), thereby changing the arrangement of liquid crystal molecules in the first cholesteric liquid crystal layer 213 and configuring the first cholesteric liquid crystal layer 213 may be in a focal conic state or a planar state, wherein the overlapping region P21 is substantially equivalent to the pixel of the reflective cholesteric liquid crystal display 200a.

The first cholesteric liquid crystal layer 213 in FIG. 1A is in a planar state, and the first cholesteric liquid crystal layer 213 in FIG. 1B is in a focal conic state. Referring to FIG. 1A, the first cholesteric liquid crystal layer 213 in a planar state receives the external light R20 and reflects the first visible light R21 in the external light R20 when the external light R20 enters into the reflective cholesteric liquid crystal display 200a from the first upper transparent substrate 211u, so the first cholesteric liquid crystal layer 213 can generate the first visible light R21 including a specific first wavelength range. It should be noted that although the first visible light R21 includes the first wavelength range, the first visible light R21 also includes the wavelength ranges other than the first wavelength range, so the first wavelength range is not equal to the entire wavelength range of the first visible light R21.

The first visible light R21 may be light with a specific color, such as red, green, or blue light. The first wavelength range may be a wavelength range of a certain color light. The first visible light R21 passes through the first upper transparent electrode pattern 212u and the first upper transparent substrate 211u and then emits from the upper surface U11u of the first upper transparent substrate 211u. At this time, a bright state screen formed by the first visible light R21 can be seen when viewing the display screen of the reflective cholesteric liquid crystal display 200a, that is, when viewing the upper surface U11u in the direction Z1.

The first display unit 210a further includes a first light absorbing layer 214 formed on the first upper transparent substrate 211u. The first light absorbing layer 214 is formed on the surface of the first upper transparent substrate 211u, for example, is formed on the upper surface U11u or the lower surface U11d of the first upper transparent substrate 211u, wherein the first light absorbing layer 214 may or may not contact the first upper transparent substrate 211u. Therefore, the first light absorbing layer 214 may be formed between the first upper transparent substrate 211u and the first upper transparent electrode pattern 212u, as shown in FIGS. 1A and 1B. Alternatively, the first upper transparent substrate 211u may be located between the first upper transparent electrode pattern 212u and the first light absorbing layer 214. Therefore, FIGS. 1A and 1B are merely examples, and the first light absorbing layer 214 is not limited to be formed between the first upper transparent substrate 211u and the first upper transparent electrode pattern 212u.

The first light absorbing layer 214 can be made of a photoresist material or ink, and the forming method of the first light absorbing layer 214 may include spin coating, roller coating or spray coating/ink jet printing, wherein the thickness 214t of the first light absorbing layer 214 may be between 0.1 μm and 100 μm. The first light absorbing layer 214 absorbs light other than the first wavelength range, so the first visible light R21 other than the first wavelength range is absorbed by the first light absorbing layer 214 and the first visible light R21 in the first wavelength range passes through the first light absorbing layer 214 when the first visible light R21 enters into the first light absorbing layer 214. In other words, the first light absorbing layer 214 absorbs a portion of the first visible light R21 and allows other portion of the first visible light R21 to pass therethrough.

The first light absorbing layer 214 absorbs light other than the first wavelength range, and the external light R20 and the first visible light R21 are incident on the first light absorbing layer 214 in the reflective cholesteric liquid crystal display 200a. Therefore, the first light absorbing layer 214 allows the first visible light R21 in the first wavelength range to pass through the first light absorbing layer 214 and the first upper transparent substrate 211u, and reduces the emission of the first visible light R21 other than the first wavelength range from the first upper transparent substrate 211u. As a result, the first light absorbing layer 214 contributes to improve the color saturation and the image quality of the reflective cholesteric liquid crystal display 200a.

Referring to FIG. 1B, when the first cholesteric liquid crystal layer 213 is in a focal conic state, the external light R20 is incident on the first upper transparent substrate 211u, sequentially passes through the first light absorbing layer 214, the first upper transparent electrode pattern 212u, the first cholesteric liquid crystal layer 213 and the first lower transparent electrode pattern 212d, and is incident on the first lower substrate 211d. In addition, the first light absorbing layer 214 absorbs the external light R20 other than the first wavelength range when the external light R20 passes through the first light absorbing layer 214, so the wavelength range of the external light R20 after passing through the first light absorbing layer 214 changes and is different from the wavelength range of the original external light R20.

The reflective cholesteric liquid crystal display 200a may further include a black light-shielding layer 220, which may be composed of ink or dye resin and may be formed by roller coating, screen printing or spray coating/ink jet printing. The black light-shielding layer 220 may be formed on the first lower substrate 211d. Under the condition that the first cholesteric liquid crystal layer 213 is in a focal conic state, the external light R20 passes through the first lower transparent electrode pattern 212d and the first lower substrate 211d and is incident on the black light-shielding layer 220, so the black light-shielding layer 220 absorbs the external light R20. At this time, the color of the black light-shielding layer 220 can be seen when viewing the display screen (i.e., upper surface U11u) of the reflective cholesteric liquid crystal display 200a. As a result, the reflective cholesteric liquid crystal display 200a displays a dark screen when the first cholesteric liquid crystal layer 213 is in a focal conic state.

It can be seen from this that the first cholesteric liquid crystal layer 213 in a focal conic state causes the reflective cholesteric liquid crystal display 200a to display a dark screen, and the first cholesteric liquid crystal layer 213 in a planar state causes the reflective cholesteric liquid crystal display 200a to display a bright screen, so the reflective cholesteric liquid crystal display 200a can display bright and dark screens and thus display images. In addition, since the first light absorbing layer 214 reduces the emission of the first visible light R21 other than the first wavelength range from the first upper transparent substrate 211u, the first light absorbing layer 214 contributes to improve the color saturation and the image quality of the reflective cholesteric liquid crystal display 200a.

Referring to FIGS. 1A and 1B, the first display unit 210a may further include a first black pattern 215. The first black pattern 215 may be made of metal, graphite, or a black photoresist material or ink, and the forming method of the first black pattern 215 may include thin film deposition, spin coating, photolithography, roller coating, screen printing or spray coating/ink jet printing. The first black pattern 215 is located between the first upper transparent substrate 211u and the first upper transparent electrode pattern 212u. Taking FIGS. 1A and 1B as an example, the first black pattern 215 has a plurality of first grids 215h, and the first light absorbing layer 214 is filled in the first grids 215h. Therefore, part of the first light absorbing layer 214 may be located between the first black pattern 215 and the first upper transparent electrode pattern 212u, while other part of the first light absorbing layer 214 extends into the first grids 215h.

Figure 1D:
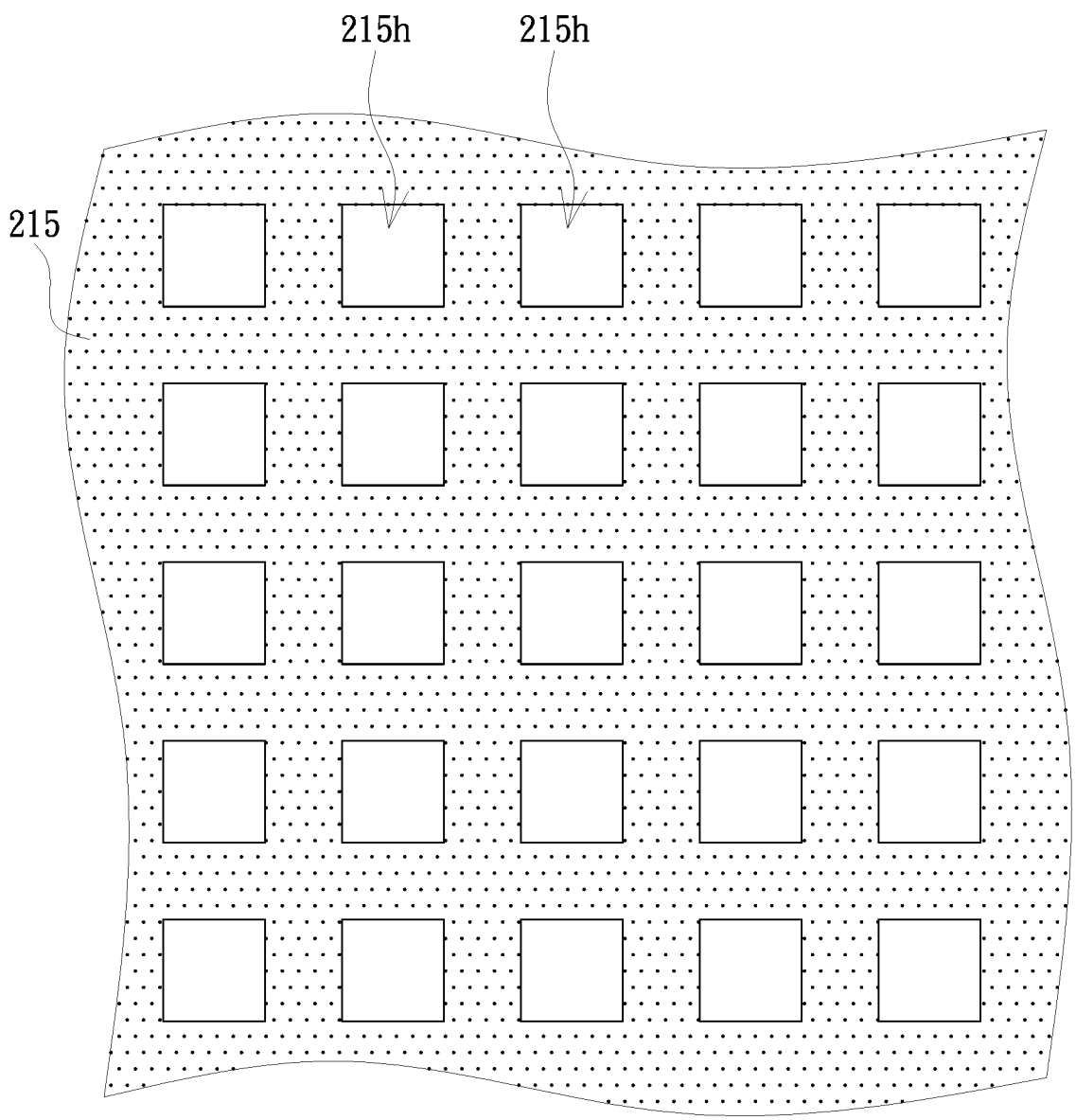
FIG. 1D is a schematic top view of the first black pattern in FIG. 1A.

FIG. 1D is a schematic top view of the first black pattern in FIG. 1A, and FIG. 1D is drawn by viewing the reflective cholesteric liquid crystal display 200a in a direction Z1 in FIG. 1A to depict the first black pattern 215. Referring to FIGS. 1C and 1D, the overlapping regions P21 (e.g., oblique regions in FIG. 1C) between the first upper transparent electrode pattern 212u and the first lower transparent electrode pattern 212d are respectively aligned with the first grids 215h, so the first black pattern 215 does not cover the overlapping regions P21, and the pixels of the reflective cholesteric liquid crystal display 200a respectively align with the first grids 215h.

The first black pattern 215 blocks the external light R20 and the first visible light R21, so that the external light R20 and the first visible light R21 penetrate the first black pattern 215 from the first grids 215h. Therefore, the first black pattern 215 allows the first visible light R21 emitted from the overlapping regions P21 to pass therethrough, but blocks the first visible light R21 emitted from the region other than the overlapping regions P21. In this way, the first black pattern 215 basically does not cover the pixels and contributes to prevent light leakage, so as to improve the contrast and the image quality.

Referring to FIGS. 1A and 1B, the first display unit 210a may further include a sealant 216. The sealant 216 is located between the first upper transparent substrate 211u and the first lower substrate 211d, and connects the first upper transparent substrate 211u and the first lower substrate 211d. The sealant 216 surrounds the first cholesteric liquid crystal layer 213, so that the first cholesteric liquid crystal layer 213 is sealed in an accommodating space defined by the first upper transparent substrate 211u, the first lower substrate 211d and the sealant 216, thereby preventing leakage of the first cholesteric liquid crystal layer 213.

It should be noted that the amount of voltage applied between the first upper transparent electrode pattern 212u and the first lower transparent electrode pattern 212d controls the grayscale of the pixels (i.e., overlapping regions P21 in FIG. 1C), and the amount of voltage can be adjusted by an external control element (not shown) electrically connected to the first upper transparent electrode pattern 212u and the first lower transparent electrode pattern 212d. The external control element may include, for example, a timing controller (TCON) or a processor.

Figure 2A:
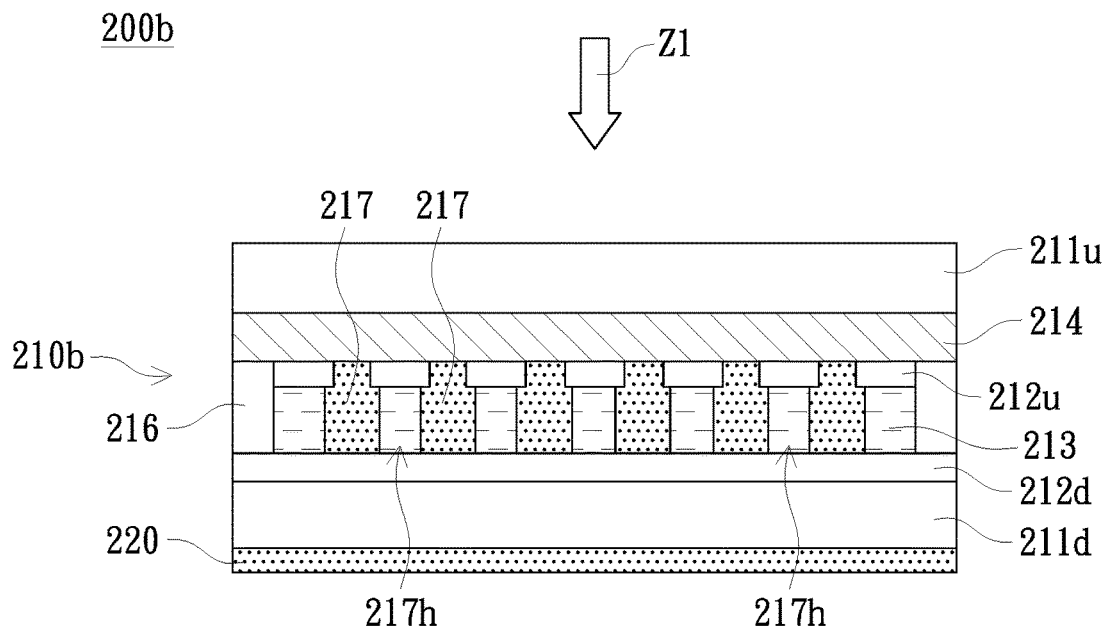
FIG. 2A is a schematic cross-sectional view of a reflective cholesteric liquid crystal display according to another embodiment of the present invention.

FIG. 2A is a schematic cross-sectional view of a reflective cholesteric liquid crystal display according to another embodiment of the present invention. The reflective cholesteric liquid crystal display 200b shown in FIG. 2A is similar to the reflective cholesteric liquid crystal display 200a of the previous embodiment. The main difference between the reflective cholesteric liquid crystal displays 200a and 200b is the plurality of first spacers 217 included in the first display unit 210b of the reflective cholesteric liquid crystal display 200b and the reflective cholesteric liquid crystal display 200b does not include the first black pattern 215.

The first spacers 217 are sandwiched between the first upper transparent substrate 211u and the first lower substrate 211d. The first spacers 217 can be squeezed by the first upper transparent substrate 211u and the first lower substrate 211d, so that the first cholesteric liquid crystal layer 213 does not flow to between the first spacers 217 and the first upper transparent substrate 211u and also not flow to between the first spacers 217 and the first lower substrate 211d. In other words, the first cholesteric liquid crystal layer 213 does not enter the region occupied by the first spacers 217 between the first upper transparent substrate 211u and the first lower substrate 211d.

Figure 2B:
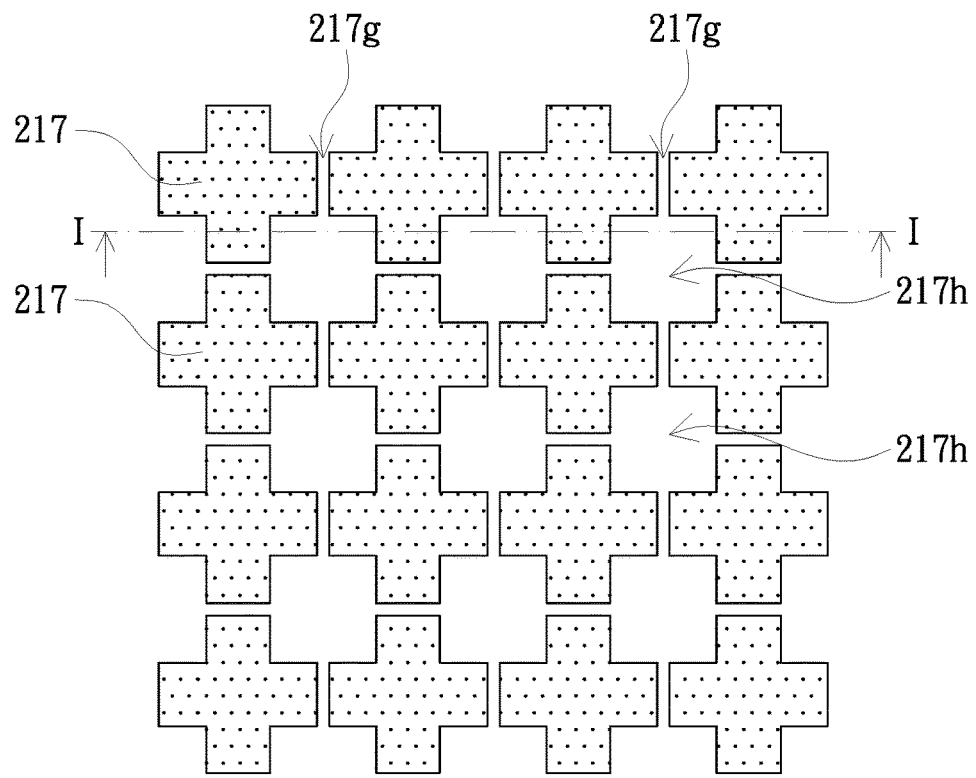
FIG. 2B is a schematic top view of the first spacers in FIG. 2A.

FIG. 2B is a schematic top view of the first spacers in FIG. 2A drawn by viewing the reflective cholesteric liquid crystal display 200b in a direction Z1 in FIG. 2A, wherein the first spacers 217 shown in 2A are drawn along the line I-I in FIG. 2B. Referring to FIGS. 2A and 2B, the shape of each first spacer 217 may be a cross-shaped pillar, such as the pillar having a cross shape on its bottom as shown in FIG. 2B. The first spacers 217 are arranged in an array and define a plurality of openings 217h. Taking FIG. 2B as an example, four surrounding adjacent first spacers 217 define an opening 217h, and the openings 217h are arranged in an array. The first spacers 217 are separated from each other without contact, so that a gap 217g is formed between two adjacent first spacers 217. Therefore, the openings 217h can communicate with each other by using the gaps 217g, so that the first cholesteric liquid crystal layer 213 can flow between the openings 217h.

In the reflective cholesteric liquid crystal display 200b, the openings 217h are also respectively aligned with the overlapping regions P21 (refer to FIG. 1C) between the first upper transparent electrode pattern 212u and the first lower transparent electrode pattern 212d, so the openings 217h are also respectively aligned with the pixels of the reflective cholesteric liquid crystal display 200b, and the first spacers 217 are distributed in the region other than the overlapping regions P21 (pixels). Since the first cholesteric liquid crystal layer 213 does not enter the region occupied by the first spacers 217 between the first upper transparent substrate 211u and the first lower substrate 211d and the first spacers 217 are distributed in a region other than the overlapping regions P21, the first spacers 217 contribute to prevent light leakage caused by the first cholesteric liquid crystal layer 213 in a region other than pixels, so as to improve the contrast and image quality.

The first spacers 217 may be made of a photoresist material or a resin material. The first spacers 217 made of a photoresist material can be formed by spin coating and photolithography, and the first spacers 217 made of a resin material can be directly formed by screen printing or spray coating/ink jet printing. In the present embodiment, the first spacers 217 may be transparent, so light (e.g., external light R20 and first visible light R21) may penetrate the first spacers 217 to increase the light utilization rate of the reflective cholesteric liquid crystal display 200b and thus increase the brightness of image. However, it should be noted that the first spacers 217 may be opaque in other embodiments. For example, the color of the first spacers 217 may be black, such as the first black pattern 215. The black opaque first spacers 217 also contribute to prevent light leakage. Therefore, the first spacers 217 may be transparent or opaque, and the present embodiment does not limit the first spacers 217 to be transparent.

In should be noted that the reflective cholesteric liquid crystal display 200a or 200b in the embodiments shown in FIGS. 1A, 1B and 2A may include only a first display unit (i.e., first display unit 210a or 210b) and the reflective cholesteric liquid crystal displays 200a or 200b may be a monochrome display and is suitable for use as an advertisement board or e-book. However, the reflective cholesteric liquid crystal display in other embodiments may include at least two display units.

Figure 3A:
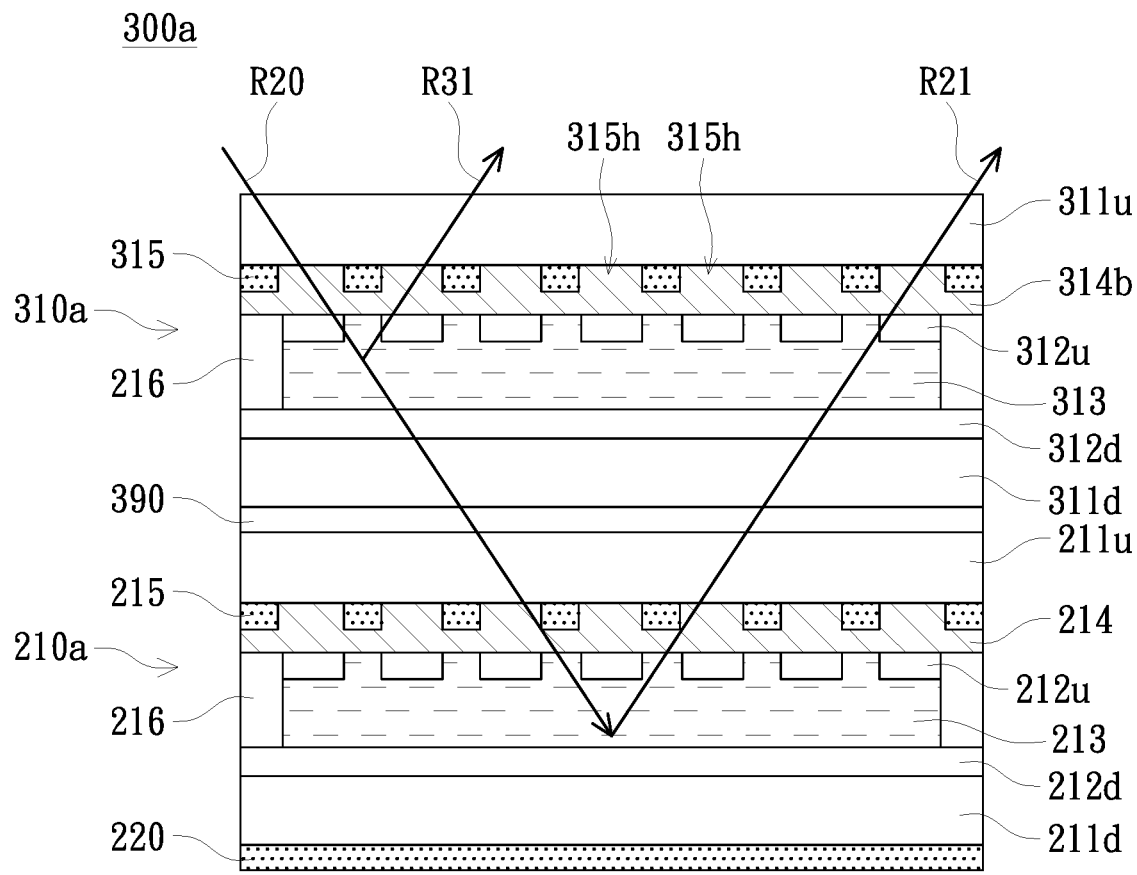
FIG. 3A is a schematic cross-sectional view of a reflective cholesteric liquid crystal display according to another embodiment of the present invention.

FIG. 3A is a schematic cross-sectional view of a reflective cholesteric liquid crystal display according to another embodiment of the present invention. Referring to FIG. 3A, the reflective cholesteric liquid crystal display 300a of the present embodiment includes a first optical transparent adhesive layer 390 and two display units: a first display unit 210a and a second display unit 310a. The first optical transparent adhesive layer 390 is adhered between the first display unit 210a and the second display unit 310a, so that the first display unit 210a and the second display unit 310a are combined together.

The configuration of the second display unit 310a is similar to that of the first display unit 210a. In detail, the second display unit 310a includes a second upper transparent substrate 311u, a second lower transparent substrate 311d, a second upper transparent electrode pattern 312u, a second lower transparent electrode pattern 312d, a second cholesteric liquid crystal layer 313, a second light absorbing layer 314b and a second black pattern 315. The arrangement positions, materials, forming methods, shapes and functions of the elements included in the second display unit 310a may correspond to those of the elements in the first display unit 210a, and no redundant detail is to be given herein.

The first cholesteric liquid crystal layer 213 in a planar state reflects the first visible light R21 in the external light R20 and the second cholesteric liquid crystal layer 313 in a planar state reflects the second visible light R31 in the external light R20 when the external light R20 is incident on the reflective cholesteric liquid crystal display 300a from the second upper transparent substrate 311u. Therefore, the first cholesteric liquid crystal layer 213 and the second cholesteric liquid crystal layer 313 can generate the first visible light R21 and the second visible light R31, respectively.

The second visible light R31 includes a specific second wavelength range and may be a light having a specific color. It should be noted that the second visible light R31 includes not only the second wavelength range but also other wavelength ranges other than the second wavelength range, so the second wavelength range is not equal to the entire wavelength range of the second visible light R31. In addition, the second wavelength range of the second visible light R31 is different from the first wavelength range of the first visible light R21, so the color of the first visible light R21 may be different from the color of the second visible light R31. For example, the first visible light R21 may be red light, and the second visible light R31 may be green light.

The forming method of the second light absorbing layer 314b may be the same as the forming method of the first light absorbing layer 214, and the second light absorbing layer 314b may also be made of a photoresist material or ink. However, the first light absorbing layer 214 and the second light absorbing layer 314b are different from each other in optical characteristics. The first light absorbing layer 214 absorbs light outside the first wavelength range, and the second light absorbing layer 314b absorbs light other than both the first wavelength range and the second wavelength range, so that both the first visible light R21 in the first wavelength range and the second visible light R31 in the second wavelength range pass through the second light absorbing layer 314b and the second upper transparent substrate 311u. In this way, the first light absorbing layer 214 reduces the emission of the first visible light R21 other than the first wavelength range from the second upper transparent substrate 311u, and the second light absorbing layer 314b reduces the emission of the second visible light R31 other than the second wavelength range from the second upper transparent substrates 311u, thereby improving the image quality of the reflective cholesteric liquid crystal display 300a.

Figure 3B:
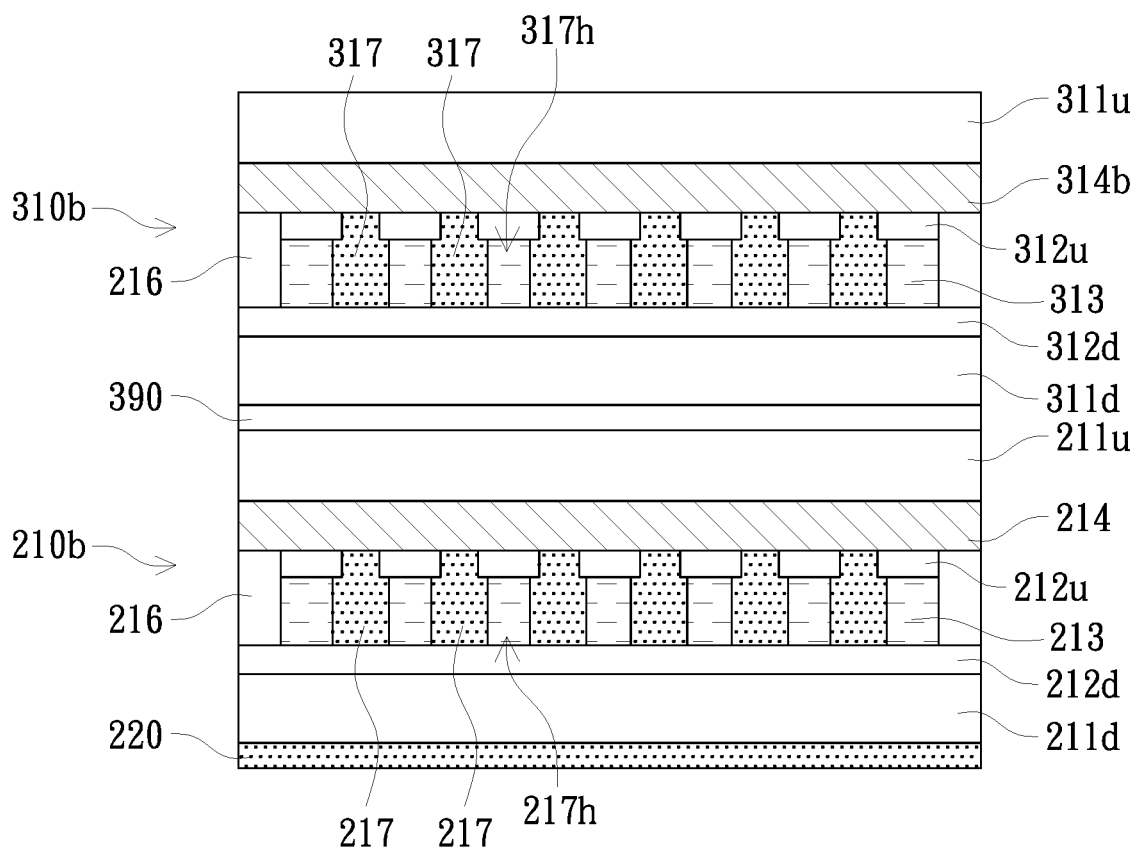
FIG. 3B is a schematic cross-sectional view of a reflective cholesteric liquid crystal display according to another embodiment of the present invention.

FIG. 3B is a schematic cross-sectional view of a reflective cholesteric liquid crystal display according to another embodiment of the present invention. Referring to FIG. 3B, the reflective cholesteric liquid crystal display 300b includes a first display unit 210b, a second display unit 310b and a first optical transparent adhesive layer 390. The first optical transparent adhesive layer 390 is adhered between the first display unit 210b and the second display units 310b, so that the first display unit 210b and the second display unit 310b are combined together. In addition, the reflective cholesteric liquid crystal display 300b of FIG. 3B is similar to the reflective cholesteric liquid crystal display 300a of FIG. 3A.

The main difference between the reflective cholesteric liquid crystal displays 300a and 300b is that the reflective cholesteric liquid crystal display 300b does not include the first black pattern 215 and the second black pattern 315, and the second display unit 310b further includes a plurality of second spacers 317. Therefore, the reflective cholesteric liquid crystal display 300b in FIG. 3B employs the first spacers 217 and the second spacers 317 to replace the first black pattern 215 and the second black pattern 315 in FIG. 3A, respectively.

Figure 4:
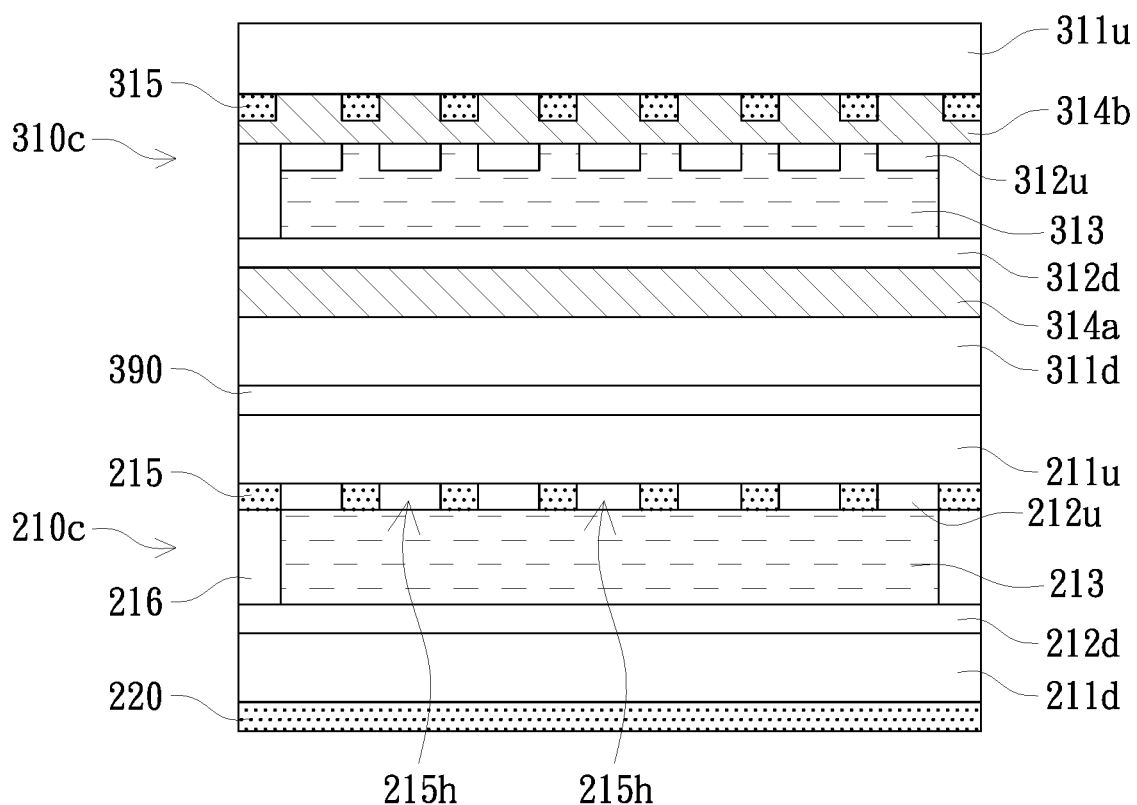
FIG. 4 is a schematic cross-sectional view of a reflective cholesteric liquid crystal display according to another embodiment of the present invention.

FIG. 4 is a schematic cross-sectional view of a reflective cholesteric liquid crystal display according to another embodiment of the present invention. Different from the reflective cholesteric liquid crystal display 300a in FIG. 3A, the first display unit 210c does not include the first light absorbing layer 214, and the second display unit 310c includes two light absorbing layers: the first light absorbing layer 314a and the second light absorbing layer 314b. The first light absorbing layer 314a is formed on the second lower transparent substrate 311d, and the second light absorbing layer 314b is formed on the second upper transparent substrate 311u. Therefore, the second display unit 310c has the first light absorbing layer 314a more than the second display unit 310a.

It is understood that the reflective cholesteric liquid crystal display of the invention may include more than two display units and therefore having more than two reflected lights with different wavelengths, and no redundant detail is to be given herein.

What is claimed is:

1. A reflective cholesteric liquid crystal display, comprising:
   a first display unit, comprising:
      a first upper transparent substrate;
      a first lower substrate;
      a first upper transparent electrode pattern, formed on the first upper transparent substrate;
      a first black pattern located between the first upper transparent substrate and the first upper transparent electrode pattern;
      a first lower transparent electrode pattern, formed on the first lower substrate, wherein the first upper transparent electrode pattern and the first lower transparent electrode pattern face each other;
      a first cholesteric liquid crystal layer, sandwiched between the first upper transparent electrode pattern and the first lower transparent electrode pattern and used for generating a first visible light, wherein the first visible light comprises a first wavelength range; and
      a first light absorbing layer, formed on the first upper transparent substrate and used for absorbing light outside the first wavelength range so that the first visible light in the first wavelength range passes through the first light absorbing layer and the first upper transparent substrate.

2. The reflective cholesteric liquid crystal display according to claim 1, wherein the first light absorbing layer is formed between the first upper transparent substrate and the first upper transparent electrode pattern.

3. The reflective cholesteric liquid crystal display according to claim 1, wherein the first display unit further comprises a plurality of first spacers sandwiched between the first upper transparent substrate and the first lower substrate.

4. The reflective cholesteric liquid crystal display according to claim 1, further comprising a second display unit and a first optical transparent adhesive layer, wherein the first optical transparent adhesive layer is adhered between the first display unit and the second display unit, and the second display unit comprises:
   a second upper transparent substrate;
   a second lower transparent substrate, wherein the first optical transparent adhesive layer is adhered between the first upper transparent substrate and the second lower transparent substrate;
   a second upper transparent electrode pattern, formed on the second upper transparent substrate;
   a second lower transparent electrode pattern, formed on the second lower transparent substrate, wherein the second upper transparent electrode pattern and the second lower transparent electrode pattern face each other; and
   a second cholesteric liquid crystal layer, sandwiched between the second upper transparent electrode pattern and the second lower transparent electrode pattern and used for generating a second visible light, wherein the second visible light comprises a second wavelength range, and the first wavelength range is different from the second wavelength range.

5. A reflective cholesteric liquid crystal display, comprising:
   a first display unit, comprising:
      a first upper transparent substrate;
      a first lower substrate;
      a first upper transparent electrode pattern, formed on the first upper transparent substrate;
      a first black pattern formed between the first upper transparent substrate and the first upper transparent electrode pattern;
      a first lower transparent electrode pattern, formed on the first lower substrate, wherein the first upper transparent electrode pattern and the first lower transparent electrode pattern face each other; and
      a first cholesteric liquid crystal layer, sandwiched between the first upper transparent electrode pattern and the first lower transparent electrode pattern and used for generating a first visible light, wherein the first visible light comprises a first wavelength range;
   a first optical transparent adhesive layer; and
   a second display unit, comprising:
      a second upper transparent substrate;
      a second lower transparent substrate, wherein the first optical transparent adhesive layer is adhered between the first upper transparent substrate and the second lower transparent substrate;
      a second upper transparent electrode pattern, formed on the second upper transparent substrate;
      a second lower transparent electrode pattern, formed on the second lower transparent substrate, wherein the second upper transparent electrode pattern and the second lower transparent electrode pattern face each other;

a second cholesteric liquid crystal layer, sandwiched between the second upper transparent electrode pattern and the second lower transparent electrode pattern and used for generating a second visible light, wherein the second visible light comprises a second wavelength range, and the first wavelength range is different from the second wavelength range; and a first light absorbing layer, formed on the second lower transparent substrate and used for absorbing light outside the first wavelength range, so that the first visible light in the first wavelength range passes through the first light absorbing layer and the second upper transparent substrate.

6. The reflective cholesteric liquid crystal display according to claim 5, wherein the first display unit further comprises a plurality of first spacers sandwiched between the first upper transparent substrate and the first lower substrate; and the second display unit further comprises a plurality of second spacers sandwiched between the second upper transparent substrate and the second lower transparent substrate.

7. The reflective cholesteric liquid crystal display according to claim 5, wherein the second display unit further comprises a second light absorbing layer formed between the second upper transparent substrate and the second upper transparent electrode pattern and used for absorbing light outside the first wavelength range and the second wavelength range, so that both the first visible light in the first wavelength range and the second visible light in the second wavelength range pass through the second light absorbing layer and the second upper transparent substrate, and the first wavelength range is different from the second wavelength range.

8. A reflective cholesteric liquid crystal display, comprising:

a first display unit, comprising:
 a first upper transparent substrate;
 a first lower substrate
 a first upper transparent electrode pattern, formed on the first upper transparent substrate;
 a first lower transparent electrode pattern, formed on the first lower substrate, wherein the first upper transparent electrode pattern and the first lower transparent electrode pattern face each other; and
 a first cholesteric liquid crystal layer, sandwiched between the first upper transparent electrode pattern and the first lower transparent electrode pattern and used for generating a first visible light, wherein the first visible light comprises a first wavelength range;

a first optical transparent adhesive layer; and a second display unit, comprising:
 a second upper transparent substrate;
 a second lower transparent substrate, wherein the first optical transparent adhesive layer is adhered between the first upper transparent substrate and the second lower transparent substrate;
 a second upper transparent electrode pattern, formed on the second upper transparent substrate;
 a second lower transparent electrode pattern, formed on the second lower transparent substrate, wherein the second upper transparent electrode pattern and the second lower transparent electrode pattern face each other;
 a second cholesteric liquid crystal layer, sandwiched between the second upper transparent electrode pattern and the second lower transparent electrode pattern and used for generating a second visible light, wherein the second visible light comprises a second wavelength range, and the first wavelength range is different from the second wavelength range; and
 a first light absorbing layer, formed on the second lower transparent substrate and used for absorbing light outside the first wavelength range, so that the first visible light in the first wavelength range passes through the first light absorbing layer and the second upper transparent substrate, wherein the first light absorbing layer is formed between the second lower transparent substrate and the second lower transparent electrode pattern.

* * * * *